(12) United States Patent
Berger et al.

(10) Patent No.: US 7,383,854 B2
(45) Date of Patent: Jun. 10, 2008

(54) SOLENOID VALVE FOR FLUID MEDIA

(75) Inventors: Gerd Berger, Düsseldorf (DE);
Heinz-Dieter Riedel, Düsseldorf (DE);
Uwe Glaus, Düsseldorf (DE)

(73) Assignee: A.u.K Müller GmbH & Co. KG (DE)

( * ) Notice: Subject to any disclaimer, the term of this patent is extended or adjusted under 35 U.S.C. 154(b) by 301 days.

(21) Appl. No.: 11/126,876

(22) Filed: May 11, 2005

(65) Prior Publication Data
US 2005/0254973 A1 Nov. 17, 2005

(30) Foreign Application Priority Data
May 11, 2004 (DE) .................. 10 2004 023 117

(51) Int. Cl.
*F16K 31/02* (2006.01)
(52) U.S. Cl. .............. 137/375; 251/129.17; 251/335.2
(58) Field of Classification Search .......... 251/129.17, 251/331, 335.2; 137/375
See application file for complete search history.

(56) References Cited

U.S. PATENT DOCUMENTS

| | | | | |
|---|---|---|---|---|
| 1,951,037 A | * | 3/1934 | Patterson | 251/210 |
| 2,699,801 A | * | 1/1955 | Schleyer | 251/335.2 |
| 3,134,570 A | * | 5/1964 | Jarrett | 251/331 |
| 3,429,552 A | * | 2/1969 | Erickson et al. | 251/129.17 |
| 3,812,398 A | * | 5/1974 | Kozel et al. | 251/331 |
| 3,817,450 A | * | 6/1974 | Mischke | 251/333 |
| 4,176,686 A | * | 12/1979 | Stahle | 251/331 |
| 4,384,593 A | * | 5/1983 | Keller | 251/24 |
| 4,703,775 A | * | 11/1987 | Pastrone | 251/331 |
| 4,819,691 A | | 4/1989 | Löfgren et al. | |
| 4,915,353 A | * | 4/1990 | Danko | 251/331 |
| 5,265,843 A | * | 11/1993 | Kleinhappl | 251/129.17 |
| 5,529,280 A | * | 6/1996 | Satoh et al. | 251/331 |
| 6,505,814 B1 | * | 1/2003 | Satou et al. | 251/331 |
| 6,648,006 B1 | | 11/2003 | Ostergaard | |
| 6,824,116 B1 | * | 11/2004 | Woo et al. | 251/129.17 |
| 2003/0197072 A1 | * | 10/2003 | Flieger | 239/428.5 |
| 2004/0036045 A1 | * | 2/2004 | Weingarten | 251/61.5 |
| 2004/0099311 A1 | * | 5/2004 | Fukano et al. | 137/312 |

FOREIGN PATENT DOCUMENTS

DE 10162794 7/2003

\* cited by examiner

*Primary Examiner*—John Bastianelli
(74) *Attorney, Agent, or Firm*—Robert W. Becker; Robert Becker & Assoc.

(57) ABSTRACT

A solenoid valve, particularly for hot water, has a diaphragm that is disposed with no folds that accumulate air or vapor bubbles. The diaphragm extends in a smooth curve between its outer edge and its inner edge so that the bubbles are directed to the level where the mouth of the inlet conduit enters the valve chamber. Preferably the center axis of the valve chamber and a solenoid system is tipped back to form an obtuse angle with the center axis of the inlet conduit. In addition, the inlet conduit has a portion of the upper inside wall that slopes upwardly in the direction away form the valve chamber and toward the inlet. In this portion, a discharge channel, such as a groove, extends in the direction from the valve chamber to the inlet. The discharge channel helps direct accumulated air and vapor bubbles from the valve chamber out toward the inlet.

10 Claims, 5 Drawing Sheets

SOLENOID VALVE FOR FLUID MEDIA

BACKGROUND OF THE INVENTION

The present invention relates to a solenoid valve for fluid media, in particular heated water. The valve has a valve housing in which a valve chamber is disposed. The valve chamber is connected directly via an inlet conduit with a valve inlet, and is connected via a valve seat and an outlet conduit with a valve outlet. The valve has a solenoid system that is disposed on the upper side of the valve housing and has a solenoid coil. An armature extending within the solenoid coil has one end connected to a valve disk via a valve stem that extends into the valve chamber, which is sealed from the inner space of the solenoid system by a valve diaphragm. The inner or inside edge of the diaphragm is fixed on the valve stem or on the valve disk, and the outer or outside edge is fixed on the valve housing. At least a portion of the length of the upper inside wall of the inlet conduit adjoining the valve chamber is slanted downward as it extends toward the valve chamber. An example of such a valve is disclosed in DE 101 62 794 A1.

In known valves the diaphragm, by means of which the valve chamber is sealed from the inner space of the solenoid system, is constructed in the form of a conventional folded bellow into which is also integrated the valve disk. Such a bellow construction has on its upper end a circumferential fold. This fold can collect air or vapor bubbles. This collection of bubbles can become so great that the bubbles extend back into the inlet conduit. It has been found that in the region of such bubbles a particularly intense calcification of the valve takes place and the accuracy of the flow rate becomes impaired.

In a version of the prior-art valve, the inlet conduit possesses along at least a portion of its length an upper inside wall that slopes downward as it extends toward the valve chamber. Through this construction it is intended that that bubbles forming in the liquid medium are directed out and away against the direction of flow. It has been found, however, that this construction alone is not sufficient to also carry off the bubbles that accumulate in the bellow folds.

SUMMARY OF THE INVENTION

The present invention substantially solves or mitigates this problem. The present invention involves construction of a solenoid valve having the previously mentioned features that all the bubbles that accumulate in the valve chamber are reliably directed out through the inlet conduit into, for example, an upstream hot-water container. The calcification of the valve is thereby counteracted and flow accuracy of the valve is improved.

In accordance with the invention, a solution of this problem is accomplished in that the surface of the diaphragm that faces the valve chamber extends from the diaphragm outer edge in a basically conforming and in the same sense downward extending curve to the valve stem. The outer edge of the diaphragm is fixed at the level of the upper inside wall portion of the inlet conduit at the mouth of the valve inlet into the valve chamber (i.e. at the top of the juncture of the inlet conduit with the valve chamber). The arrangement is such that at least when the valve is in the closed condition, all portions of the described surface of the diaphragm that is in the valve chamber are disposed below the outer edge. Further advantageous embodiments of the invention are more fully described below and in the claims.

In a fundamental aspect of the invention, the diaphragm is constructed such that it no longer has folds, but extends in a continuous curve from its attachment to the valve housing to the valve stem. The outer edge the diaphragm is at the level of the upper portion of the inside surface of the inlet conduit at its opening into the valve chamber. At least in the closed condition of the valve all parts of the surface of the diaphragm facing the valve chamber are disposed below the outer edge. With this construction all of the bubbles that form in the valve chamber, when they rise, can glide along the surface of the diaphragm, and so be directed into the inlet conduit. From there the bubbles are then directed outwardly on the sloping and ascending upper inside wall portion of the inlet conduit. It has been found to be advantageous if the upper inside wall portion of the inlet includes a discharge channel in form of a groove that slopes upwardly from the inside toward the outside. The groove has a V-shaped cross-section and extends outwardly over at least part of the length of said upper inside wall portion from the mouth of the inlet conduit into the valve chamber. The slope of the groove may be the same or different from the slope of the upper inside wall portion. Along the upwardly extending part of the inner wall, air and vapor bubbles, because of their buoyancy, will be outwardly directed as if along a steep slope. By means of the V-shaped cross-section of the groove the friction between the bubbles and the inner wall of the inlet conduit is greatly reduced, so that the travel of the bubbles is assisted.

The curved continuous diaphragm can in its travel from the outer edge to the inner edge have one or more bends.

As further described below by means of an example, it is further advantageous for the removal of lime and calcification particles from the valve if the valve seat is raised with respect to the floor the valve chamber, so that in the region around the valve seat a ring-shaped recess is formed. In this recess lime particles can be collected, which are then prevented, or at least hindered, from traveling to the region of the valve seat.

In a further, particularly advantageous aspect of the inventive valve, the center axis of the valve chamber and the solenoid system deviates from the vertical in a manner that its forms an obtuse angle with the center axis of the inlet conduit. The valve is accordingly tilted back by a predetermined angle from the inlet conduit. This has the result that the region underneath the diaphragm, upon which air and vapor bubbles collect, is at a slope such that the beginning of the discharge channel in the inlet conduit is at the highest point of the diaphragm. Thereby, all of the bubbles gathering along the diaphragm will end up at this highest point, there to be directed away into the discharge channel.

It is further an advantage of the invention, if at least the upper inside wall of the inlet conduit and/or the inner surface of the diaphragm is covered with a substance that renders the surface hydrophobic as well as imports a microstructuring of the surface in the nanometer region to cause a self cleaning effect. This effect is known by the registered trademark, "Lotus-Effect". The effect works in a manner such that water drops upon such a surface acquire a spherical shape and drip off with particular ease. The same effect occurs when air bubbles within water come upon such a surface. The effect results in a boost to the falling of the air or vapor bubbles away from the surface to be directed outwardly through the inlet conduit.

Following is a detailed description of the inventive solenoid valve in conjunction with schematic drawings and operational examples.

DESCRIPTION OF SPECIFIC EMBODIMENTS

Figure 1:
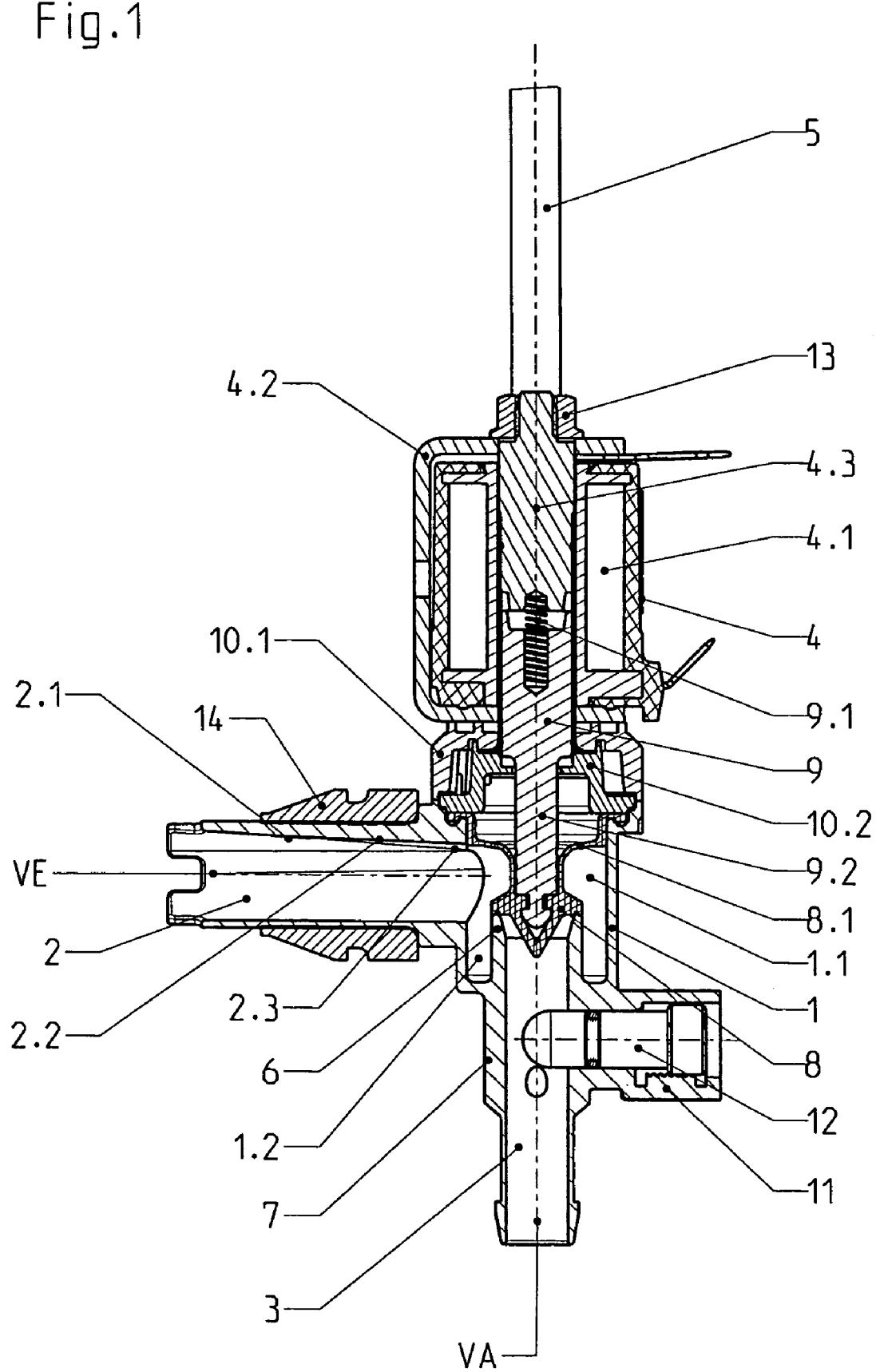
FIG. 1 is a cross-sectional view of a solenoid valve through the center axis of the inlet conduit.
Figure 2:
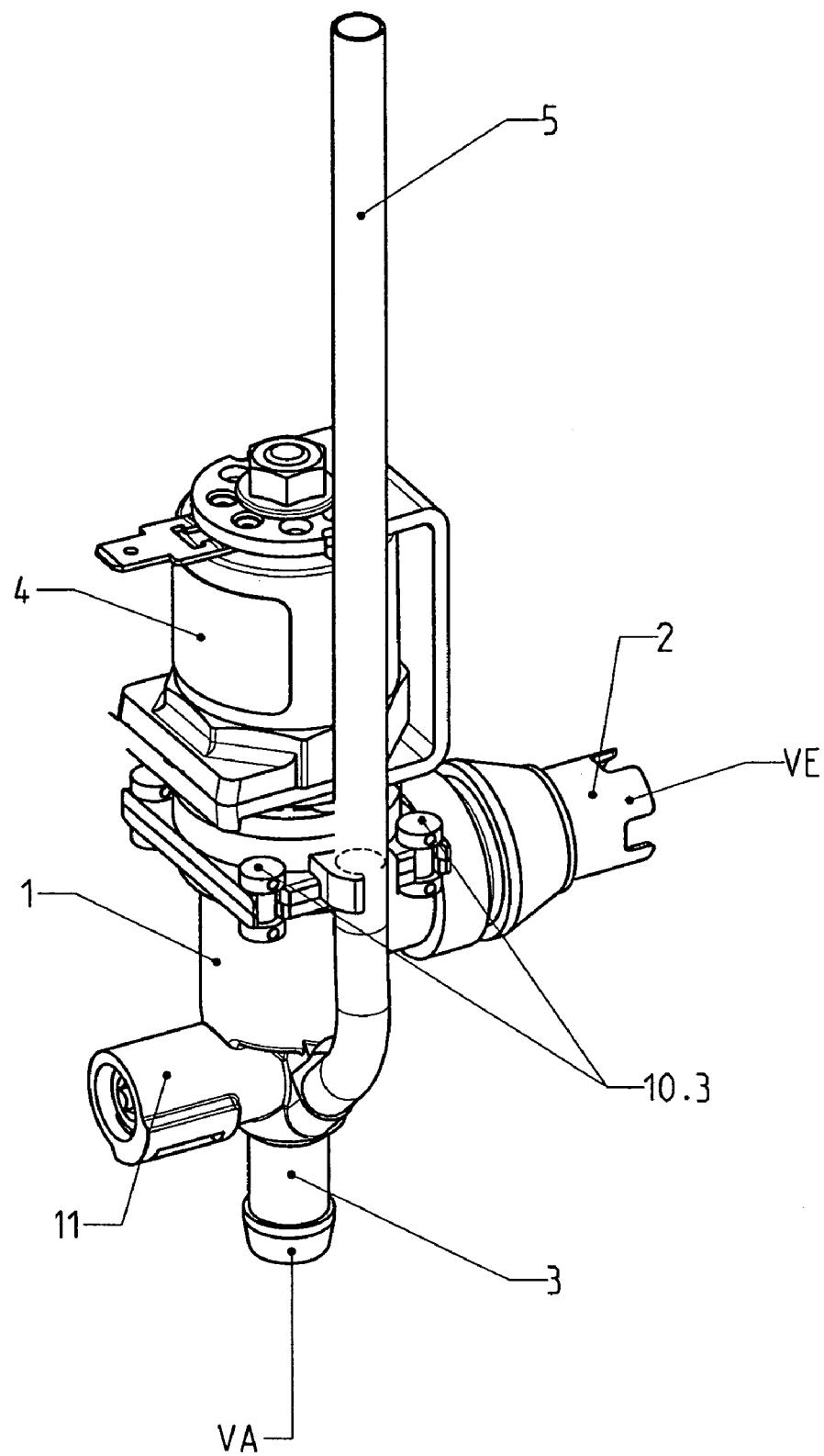
FIG. 2 is a perspective view of the solenoid valve of FIG. 1.
Figure 3:
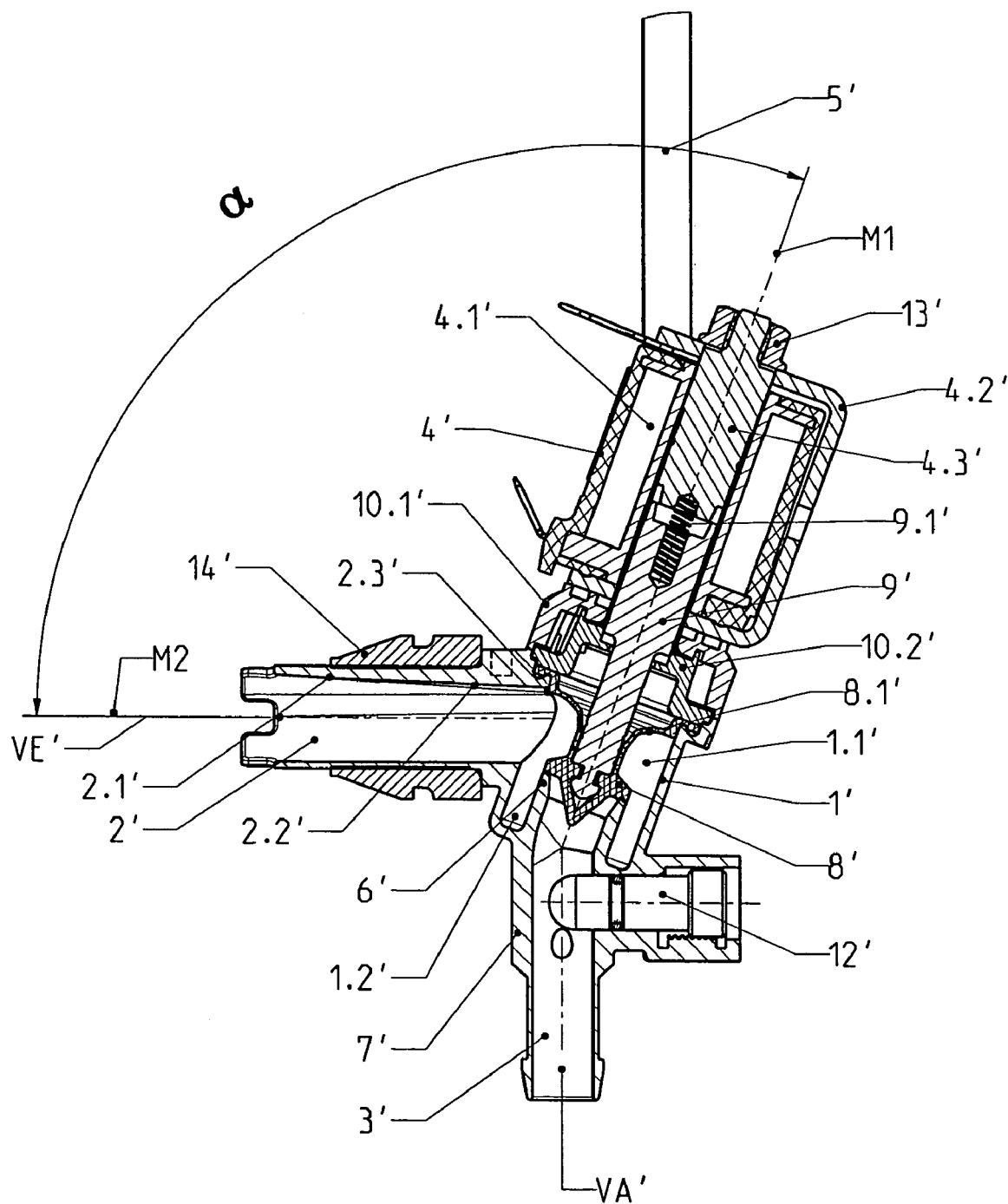
FIG. 3 is a view similar to FIG. 1, showing a further embodiment of the solenoid valve tipped backwards relative to the inlet conduit.
Figure 4:
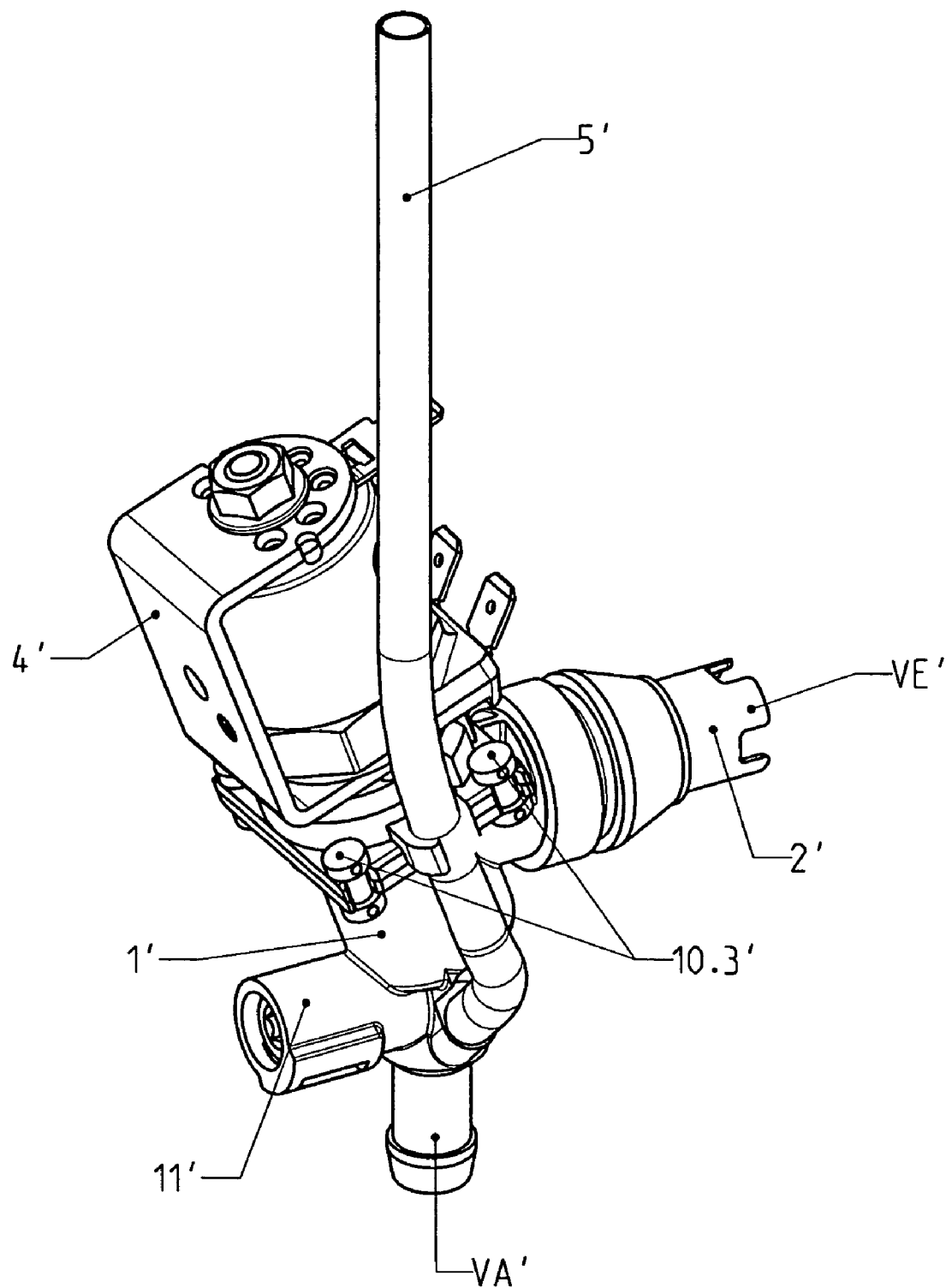
FIG. 4 is a view similar to FIG. 2 of the solenoid valve of FIG. 3.

Referring to FIG. 1 and FIG. 2, shown is a solenoid valve that comprises a valve housing 1, in which is disposed a valve chamber 1.1. This valve chamber 1.1 is connected via an inlet conduit 2 with the inlet VE, and is connected via a valve seat 6 and an outlet conduit 3 with the outlet VA. In the valve chamber 1.1 is disposed a valve disc 8 that is moveable between an open position and a closed position. In the closed position it sits in a sealing manner upon the valve seat 6. The valve is contemplate for the assembly shown in FIG. 1, a construction where the outlet conduit 3 is on the lower side of the valve housing 1. On the upper side of the valve housing 1 is arranged a solenoid system 4, which, by the attachment pieces 10.1 and 10.2 and 10.3 is attached fixedly with the valve housing 1. The solenoid system 4 comprises a solenoid coil 4.1, in which is arranged a solenoid armature 9. The upper end of the solenoid armature 9 opposes a headpiece 4.3 that is arranged in the upper part of the solenoid coil 4.1, and is connected to a solenoid yoke 4.2. The other end of the solenoid armature 9 is attached to the valve disk 8 by means of a valve stem 9.2, which passes through the valve chamber 1.1. The seal between the inner space of the solenoid system 4 and the valve chamber 1.1 is accomplished by means of a diaphragm 8.1 that is manufactured as one piece with the valve disk 8. In the de-energized state of the solenoid coil 4.1, the valve disk 8 is held firmly in a closed position by means of a pressure spring 9.1 disposed between the solenoid armature 9 and the headpiece 4.3. In the energized state of the solenoid coil 4.1, the valve disk 8 is moved into the open position.

The valve seat 6 is disposed at the inner end of an outlet part 7 that includes the outlet conduit 3 and the valve outlet VA. The floor of the valve chamber 1.1, to form a recess 1.2 in the region around the valve seat 6 for collecting calcification particles, is disposed somewhat below the valve seat and the mouth of the inlet conduit 2 into the valve chamber 1.1.

The outer edge of the diaphragm 8.1 is attached to the valve housing 1 such that it is disposed on the mouth 2.3 of the inlet conduit 2 as it comes into the valve chamber 1.1, at the level of the upper inside wall portion 2.1 of the inlet conduit. From this point the diaphragm extends in a basically uniform or even curve, except for breaks, and in the same manner continues downwardly with the same sort of uniform and even curve to the valve stem 9.2. As is shown in the drawing, the arrangement is such that at least when the valve is in the closed condition, all parts of the surface of diaphragm 8.1 facing in the valve chamber 1.1 are disposed below the outer edge of the diaphragm and there are no folds formed that extend upwardly.

Figure 5:
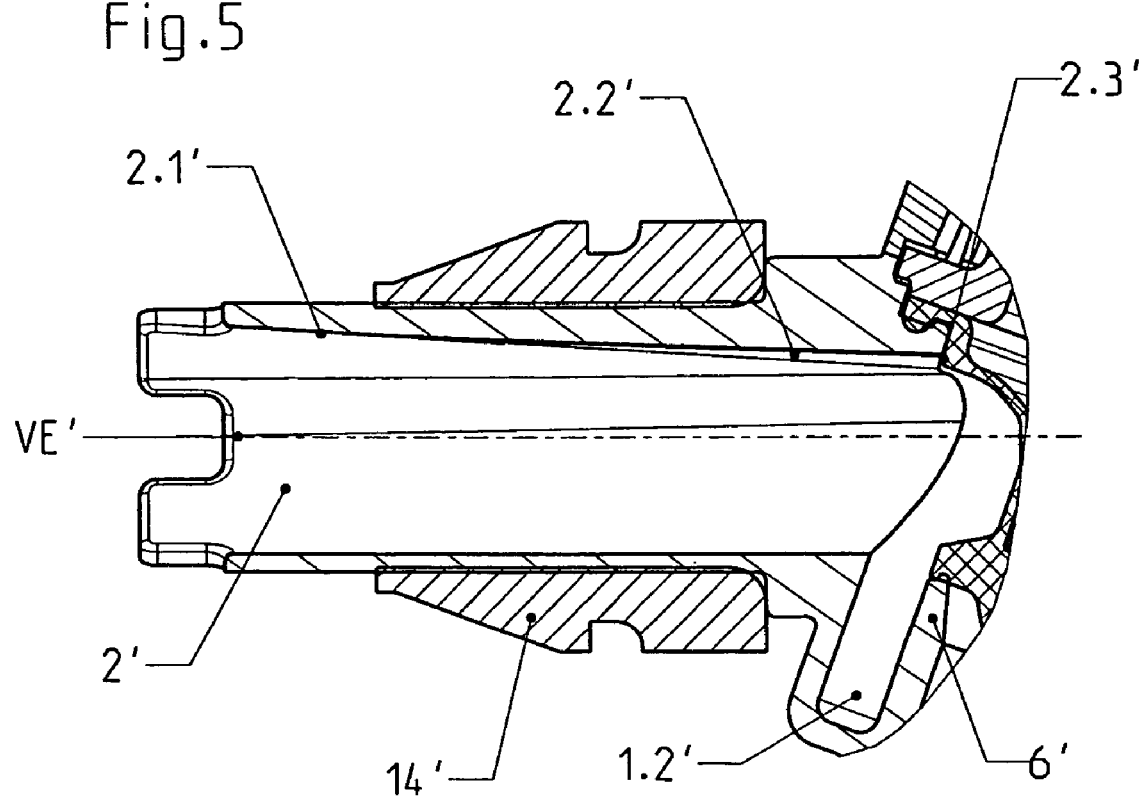
FIG. 5 is an enlarged depiction of the solenoid valve according to FIG. 3 in the region of the inlet conduit.

The upper inside wall portion 2.1 of the inlet conduit 2 is constructed as a discharge channel that slants upwardly and outwardly and in which is disposed a groove 2.2 extending over at least a portion of the length the discharge channel from the place where the mouth 2.3 opens into the valve chamber 1.1. The groove has a V-shaped cross-section (see also FIGS. 5 and 6.)

The result of this arrangement is that bubbles that accumulate in the valve chamber 1.1 gather at the surface of the diaphragm 8.1. The bubbles do not remain there, but, in consequence of the development of eddies in the valve chamber 1.1, the bubbles are directed outwardly to the inlet mouth 2.3 and finally to the discharge conduit. From there the bubbles are directed out along the groove 2.2 in which the bubbles are directed against the direction of the fluid flow.

Disposed on the outlet part 7, transverse to the axial direction, is a side tube 11 as a tube that opens into the outlet conduit 3. In the side tube 11 is a movable metering screw 12 that is disposed in a cross-wise direction to the outlet conduit 3.

Further, an aeration pipe 5 (FIG. 2) communicates with the outlet conduit 3.

On the solenoid system 4, the headpiece 4.3 is secured to the solenoid yoke 4.2 via a threaded nut 13.

On the outside of the inlet conduit 2 is disposed a sealing part 14, by which the valve can be installed watertight in a hot water tank (not shown).

Figure 6:
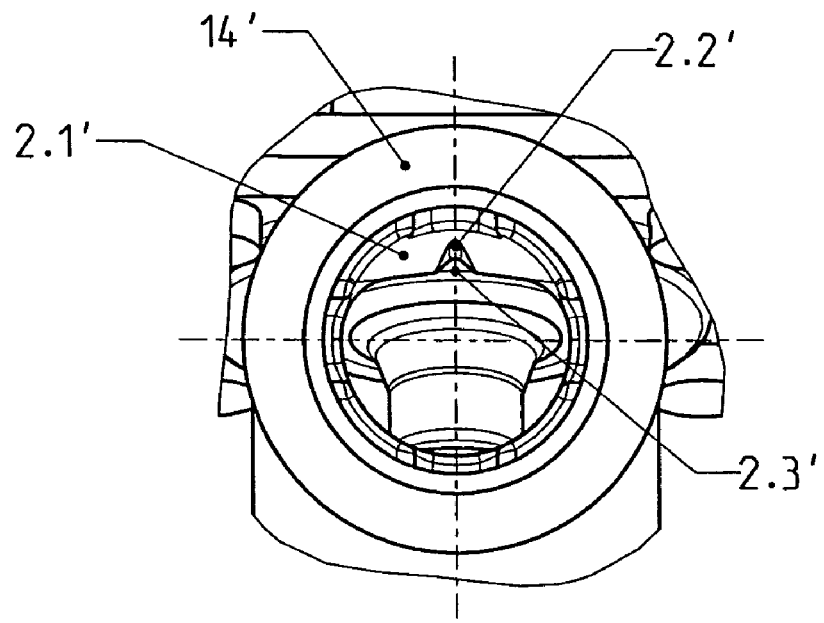
FIG. 6 is a view from the valve inlet into the inlet conduit shown in FIG. 5.

In FIG. 3 to FIG. 6 is shown a somewhat altered embodiment of the valve shown in FIGS. 1 and 2. In FIG. 3 to FIG. 6, all of the components are designated with the same reference numerals as in FIGS. 1 and 2, except with an appended apostrophe. The fundamental construction of this embodiment is the same as the embodiment of FIGS. 1 and 2, and therefore this will not be described again. The difference between the two embodiments it that with the valve of FIGS. 3 and 4, the center axis M1 of the solenoid system 4' and valve chamber 1.1' departs from the vertical and forms an obtuse angle, α (alpha), with the center axis M2 of the inlet conduit 2'. In this way the valve, with respect to the inlet conduit 2', appears to be tipped backward (as seen clearly in FIG. 3), such that the bubbles that build up in the valve chamber 1.1' will travel along the surface of the diaphragm 8.1' facing the valve chamber to the highest point at the mouth 2.3' of the inlet conduit 2. There the bubbles go directly into the discharge channel 2.2', by which the bubbles are directed away. In particular, FIG. 6 shows a detail of the portion of the upper inside wall 2.1' of the inlet conduit 2'. The upper inside wall portion 2.1' comprises in the inner region, i.e. near the mouth 2.3' of the inlet conduit 2 into the valve chamber 1.1', a less circular and flatter curved surface as compared to the outer region of the inlet conduit more toward the inlet. Further in this portion of the upper inside wall is disposed the groove 2.2' having a V-shaped cross-section, via which bubbles are directed away.

With both embodiments of the solenoid valve there are advantages when at least the portion of the upper inside wall 2.1, 2.1' of the inlet conduit and/or the inner surface of the diaphragm 8.1, 8.1' are coated with a substance that imports the surface water-repellency, and also a nanostructure that causes a self-cleaning effect.

The specification incorporates by reference the disclosure of German priority document 10 2004 023 117.6 filed 11 May 2004.

The present invention is, of course, in no way restricted to the specific disclosure of the specification and drawings, but also encompasses any modifications within the scope of the appended claims.

What is claimed is:

1. A solenoid valve for fluid media comprising:
   a valve housing having a valve chamber that communicates with an inlet via an inlet conduit and communicates with an outlet via an outlet conduit and valve seat;
   a solenoid system disposed on the valve housing and having a solenoid coil with solenoid armature, an end of which is attached to a valve disk by means of a valve stem that extends through the valve chamber; and
   a diaphragm that provides a seal between the valve chamber and interior of the solenoid system, the diaphragm having an inner edge and an outer edge, the inner edge being fixed on the valve stem or the valve disk, and the outer edge being fixed on the valve housing, wherein the diaphragm is fixed at a location on its outer edge to the valve housing at a mouth of the inlet conduit where it enters the valve chamber, so that an inner surface of the diaphragm that is disposed in the valve chamber extends from the outer edge in a basically uniform downward curve to the inner edge at the valve stem or valve disk, wherein at least when the valve is in a closed position with the valve disk in a sealing relationship with the valve seat, all portions of said surface of the diaphragm are disposed below the outer edge, further wherein a recess is provided in the valve chamber for collecting calcification particles by providing a floor in the region around the valve seat that is lower than the valve seat and the mouth of the inlet conduit.

2. The solenoid valve according to claim 1 wherein an upper inside wall portion of the inlet conduit slopes downwardly in a direction from the inlet toward the valve chamber, to form a discharge channel.

3. The solenoid valve according to claim 2 wherein at least a portion of the discharge channel is a groove having a V-shaped cross-section and extends from the mouth of the inlet conduit where it enters the valve chamber.

4. The solenoid valve according to claim 3 wherein the groove has a floor that slopes at a different angle than the downward slope of the upper inside wall portion of the inlet conduit.

5. The solenoid valve according to claim 2 wherein in a region of the discharge channel in the upper inside wall portion, the upper inside wall portion has a flatter curvature at regions nearer to the valve chamber as compared with regions more toward the inlet.

6. The solenoid valve according to claim 1 wherein the diaphragm has at least one bend as it extends between the outer edge and the inner edge.

7. The solenoid valve according to claim 1 wherein the valve is so constructed that a center axis of the valve chamber and the solenoid system deviates from the vertical and is at an obtuse angle with a center axis of the inlet conduit.

8. The solenoid valve according to claim 1 wherein at least a portion of a surface of either or both of the upper inside wall of the inlet conduit and of the inner surface of the diaphragm is coated with a substance that lends a hydrophobic property to the surface with a nanoscale structure and imports a self cleaning effect to the surface.

9. A solenoid valve for fluid media comprising:
   a valve housing having a valve chamber that communicates with an inlet via an inlet conduit and communicates with an outlet via an outlet conduit and valve seat;
   a solenoid system disposed on the valve housing and having a solenoid coil with solenoid armature, an end of which is attached to a valve disk by means of a valve stem that extends through the valve chamber; and
   a diaphragm that provides a seal between the valve chamber and an interior of the solenoid system, the diaphragm having an inner edge and an outer edge, the inner edge being fixed on the valve stem or the valve disk, and the outer edge being fixed on the valve housing, wherein an inside wall portion of the inlet conduit slopes downwardly in a direction from the inlet to yard the valve chamber, and wherein the inside wall portion includes a discharge channel that slopes downwardly in the direction from the inlet toward the valve chamber, further wherein at least a portion of the discharge channel is a groove having a V-shaped cross-section.

10. The solenoid valve according to claim 9 wherein the groove has a floor that slopes at a different angle than the downward slope of the inside wall portion of the inlet conduit.

* * * * *